(12) United States Patent
Greenzeiger et al.

(10) Patent No.: US 8,965,828 B2
(45) Date of Patent: Feb. 24, 2015

(54) INFERRING USER MOOD BASED ON USER AND GROUP CHARACTERISTIC DATA

(75) Inventors: Michael Froimowitz Greenzeiger, Sunnyvale, CA (US); Ravindra Phulari, San Jose, CA (US); Mehul K. Sanghavi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 13/556,023

(22) Filed: Jul. 23, 2012

(65) Prior Publication Data
US 2014/0025620 A1    Jan. 23, 2014

(51) Int. Cl.
*G06F 17/00*    (2006.01)
*G06N 5/02*    (2006.01)

(52) U.S. Cl.
USPC ............................................. 706/47

(58) Field of Classification Search
None
See application file for complete search history.

(56) References Cited

U.S. PATENT DOCUMENTS

| | | |
|---|---|---|
| 7,764,311 B2 | 7/2010 | Bill |
| 2007/0238934 A1 | 10/2007 | Viswanathan |
| 2009/0002178 A1 | 1/2009 | Guday et al. |
| 2009/0140864 A1 | 6/2009 | Aaron et al. |
| 2010/0011388 A1 | 1/2010 | Bull et al. |
| 2012/0130819 A1* | 5/2012 | Willcock et al. ............ 705/14.66 |
| 2012/0143693 A1* | 6/2012 | Chung et al. ................ 705/14.66 |
| 2012/0215715 A1* | 8/2012 | Asikainen ...................... 705/347 |
| 2013/0159228 A1* | 6/2013 | Meijer et al. .................... 706/14 |

OTHER PUBLICATIONS

Wa "MoodScope: Building a Mood Sensor from Smartphone Usage Patterns", Thesis, Rice University, Apr. 2012, pp. 66.*
Michael, Froimowitz G., "Inferring User Mood Based on User and Group Characteristic Data", ISR and Written Opinion, App. No. PCT/US2013/048312, Filed Jun. 27, 2013, Published Jan. 30, 2014, Dated Aug. 21, 2013., 27 pages.

* cited by examiner

*Primary Examiner* — Li-Wu Chang
(74) *Attorney, Agent, or Firm* — Novak Druce Connolly Bove + Quigg LLP

(57) ABSTRACT

An individual's responsiveness to targeted content delivery can be affected by a number of factors, such as an interest in the content, other content the user is currently interacting with, the user's current location, or even the time of day. A way of improving targeted content delivery can be to infer a user's current mood and then deliver content that is selected, at least in part, based on the inferred mood. The present technology analyzes mood-associated characteristic data collected over a period of time to produce at least one baseline mood profile for a user. The user's current mood can then be inferred by applying one or more mood rules to compare current mood-associated data to at least one baseline mood profile for the user.

27 Claims, 6 Drawing Sheets

INFERRING USER MOOD BASED ON USER AND GROUP CHARACTERISTIC DATA

BACKGROUND

1. Technical Field

The present disclosure relates to electronic content delivery and more specifically to inferring a user's mood for use in a targeted content delivery system.

2. Introduction

Targeted content delivery has long been an accepted means of conveying a desired message to an audience. Instead of creating a single message and delivering it to every member of the general public, a content provider would prefer to identify a segment of the population that is likely to have the greatest interest in their message. One technique often used to segment a population is to identify individuals whose characteristics satisfy a target demographic for a particular item of targeted content. However, even though an individual's overall profile indicates that the individual is likely to be receptive to the targeted content, there are many other factors that can affect an individual's responsiveness at a particular point in time. For example, if an individual is pre-occupied or unhappy, the individual may not be as receptive to certain types of content.

While the development of digital content delivery has enabled new techniques for identifying user characteristics, the user characteristics are often focused on a more general understanding of an individual's interest in targeted content. This can lead to periods of time where the targeted content delivery is misaligned, thereby resulting in decreased satisfaction for both the content provider and the content receiver.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A way of improving targeted content delivery can be to select content based, at least in part, on a user's current mood. One way of accomplishing this could be to query the user regarding their current mood prior to selecting an item of invitational content. A targeted content delivery system can then select an item of invitational content based on the user's response. However, such an approach could quickly lead to user aggravation, and likely a majority of users reporting a similar mood. Instead, a targeted content delivery system can be configured to use an inferred or derived mood, which can be generated using the presently disclosed technology.

Disclosed are systems, methods, and non-transitory computer-readable storage media for inferring or estimating a user's current mood. A method of inferring mood can be based on deviations from a baseline mood profile. The baseline mood profile can be a general baseline mood profile representing a standard mood for a hypothetical person. However, such a baseline mood profile may not accurately represent each user. Therefore, individual baseline mood profiles can be generated for each user based on analysis of mood-associated characteristic data specific to the user. As more information is known about a user, a baseline mood profile can become more accurate, thus resulting in more accurate mood inferences. Because the accuracy level of a baseline mood profile can change over time and/or based on the information known about the user, a baseline mood profile can have an associated confidence score. The associated confidence score can represent the accuracy of the baseline mood profile. Furthermore, the associated mood profile can be used in the generation of the inferred mood and/or in calculating a confidence score for the inferred mood.

To generate an inferred mood, one or more mood rules can be applied to compare current mood-associated data for a user to at least one baseline mood profile for the user. A mood rule can be used to define how one or more current mood-associated data items should be combined and/or compared with a baseline mood profile to generate an inferred mood. A mood rule can also specify how, when, and/or what weights should be applied to the various mood-associated data items. Additionally, as part of generating the inferred mood, a confidence score can be assigned to the inferred mood, where the confidence score represents the likelihood that the inferred mood is valid and/or correct. In some cases, multiple mood rules can be applied to the current mood-associated data and the at least one baseline mood profile, which can result in multiple inferred moods. Therefore, a mood inference method can include a resolution strategy, such as the inferred moods can be averaged, the mood that occurred most frequently can be selected, or the mood with the highest confidence score can be selected.

In some embodiments, the inferred mood can be sent to a content delivery system where it can be used to select invitational content to send to a requesting user. For example, a content delivery system can use the inferred mood to assign a user to a mood segment, prioritize targeted content packages assigned to a user, and/or select an item of invitational content based on a match between a mood tag and the user's inferred mood. Additional or alternative uses of the inferred mood are also possible. For example, the inferred mood can be used to enable, disable, set, and/or adjust features on a client device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
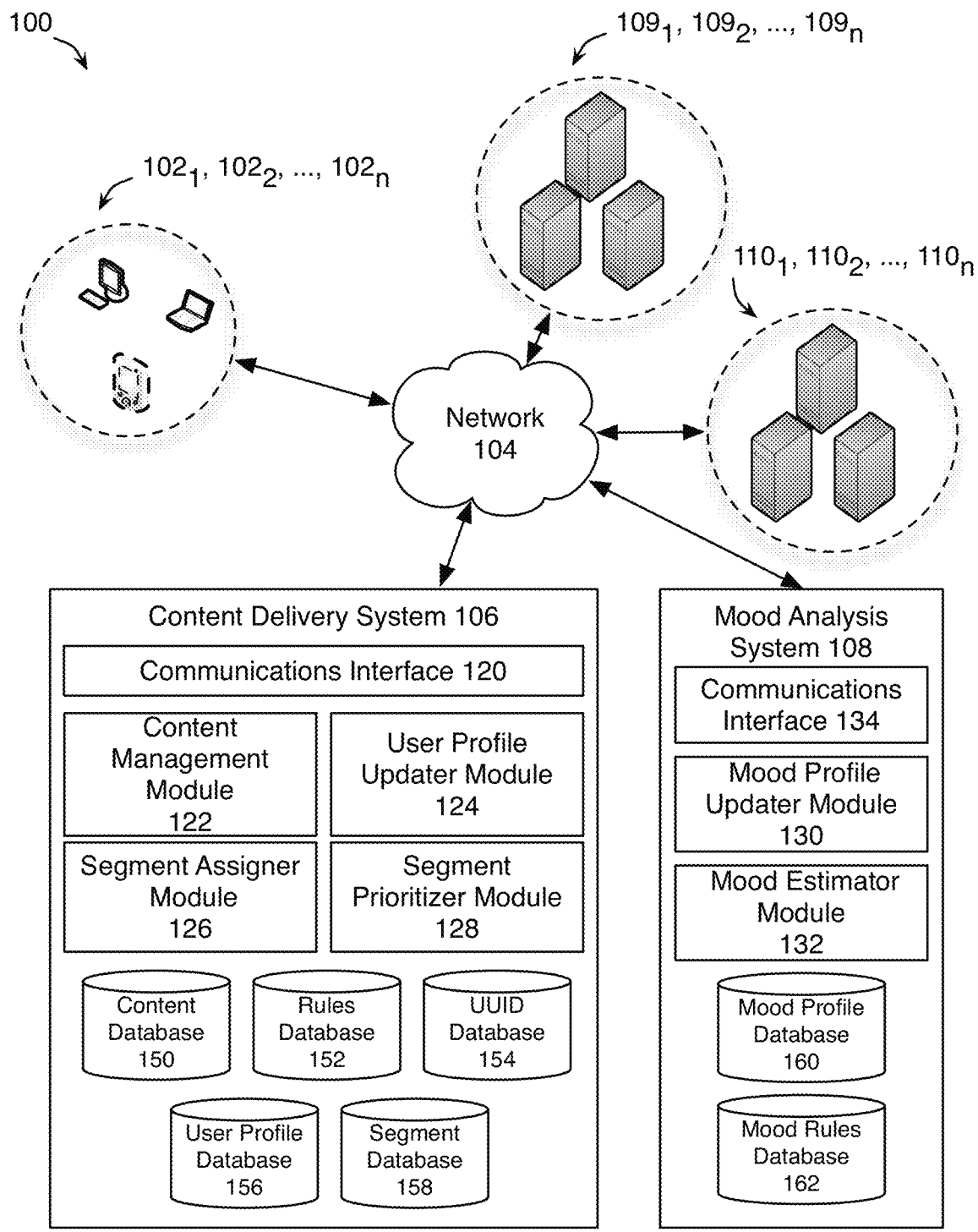
FIG. 1 illustrates an exemplary configuration of devices and a network.

The present disclosure addresses the need in the art for improved targeted content delivery. Using the present technology it is possible to infer and/or derive a user's mood and then use the inferred mood in identifying targeted content that is likely to be of interest to the user. An exemplary system configuration 100 is illustrated in FIG. 1 wherein electronic devices communicate via a network for purposes of exchanging content and other data. The system can be configured for use on a local area network, such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1, 102_2, \ldots, 102_n$ (collectively "102") connected to a network 104 by direct and/or indirect communication with a content delivery system 106. The content delivery system 106 can support connections from a variety of different client devices, such as desktop computers; mobile computers; handheld communications devices, e.g. mobile phones, smart phones, tablets; and/or any other network enabled communications devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1, 109_2, \ldots, 109_n$ (collectively "109") and content from one or more secondary content providers $110_1, 110_2, \ldots 110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the invitational content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery systems 106. In some embodiments, the content delivery system 106 can preselect the content package before a request is received.

An assembled content package can include text, graphics, audio, video, executable code, or any combination thereof.

Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as purchase or a download of the advertised item. However, invitational content can also be passive invitational content. That is, invitational content that is designed to primarily inform the user, such as a video. In some cases, passive invitational content can include information that can lead or direct users to other invitational content including active invitational content.

Furthermore, the invitational content can be dynamic invitational content. That is, invitational content that varies over time or that varies based on user interaction. However, the various embodiments are not limited in this regard and the invitational content can include static invitational content that does not vary over time or with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal 102. A subsequent content package can include one or more items of invitational content that can be presented to a user of the user terminal 102 while the user interacts with the app.

Although, primary and secondary providers 109 and 110 are presented herein as separate entities, this is for illustrative purposes only. In some cases, the primary and the secondary content providers 109 and 110 can be the same entity. Thus, a single entity can define and provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal 102. However, in some cases, the content management module 122 can be configured to retrieve content directly from content providers 109 and 110 if the metadata associated with the data in the content database 150 appears to be outdated or corrupted.

As described above, content maintained by the content providers 109 and 110 can be combined according to a predefined arrangement between the two content providers, which can be embodied as a set of rules. In an arrangement where the content delivery system 106 assembles the content package from multiple content providers, these rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including variable advertisement portions, the rules database 152 can specify rules for selecting one of the secondary providers 110. The rules can also specify how to select specific content from the selected one of secondary providers 110 to be combined with the content provided by one of primary providers 109. Once assembled, the assembled content package can be sent to a requesting one of user terminals 102.

In some content delivery systems an item of primary content, such as an app or other media object, can have one or more associated attributes. For example, an app can have one or more associated genre attributes, e.g. travel, sports, education, etc. A rule can be based on the primary content attributes. An exemplary rule can specify that the content delivery system 106 should select secondary content based on the primary content attributes. For example, the content delivery system 106 can select travel related secondary content, such as an advertisement for an airline, when the primary content has a travel attribute such as a travel related app.

In many cases, a rule based on primary content attributes is a typical arrangement entered into by secondary content providers 110. Such an arrangement can result in invitational content of little or no interest being presented to users. For example, a user that is engaged with a travel related app does not necessarily have a travel intent and thus the user is not necessarily interested in receiving invitational content from an airline. As a result, even though a desired number of impressions can be achieved, the rate of response to such invitational content may be low and/or the resulting targeted audience may be incorrect or suboptimal.

In some content delivery systems, to increase the rate of response, an item of primary and/or secondary content can have one or more associated target demographic attributes. For example, an app can have a target demographic attribute specifying an age demographic of 18-24. A rule can be based on matching target demographic attributes. Such an arrangement is likely to result in presenting invitational content that is overall of greater interest to users. However, this arrangement does not take into consideration that a user's interest can vary across time periods regardless of the primary content.

The various embodiments disclosed herein provide systems and methods for intelligently targeting invitational content to a user based on user characteristics. In particular, the present technology provides systems and methods for inferring a user's mood based, at least in part, on mood-associated characteristic data. A first aspect of the present technology provides systems and methods for inferring a mood for a user based on a hypothetical general user. A second aspect of the present technology provides systems and methods for inferring a mood for a user based on deviations from a baseline mood profile for the user. A third aspect of the present technology provides systems and methods for using an inferred mood in targeted content delivery.

As used herein, the term "user characteristics" refers to the characteristics of a particular user associated with one or more of user terminals 102. User characteristics can include channel characteristics, demographic characteristics, behavioral characteristics, spatial-temporal characteristics, and mood-associated characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics.

Mood-associated characteristics can define characteristics indicative of a user's mood at a point in time. Mood-associated characteristics can be any subset of user characteristics. For example, mood-associated characteristics can be physical characteristics, behavioral characteristics, and/or spatial-temporal characteristics. Mood-associated physical characteristics can include heart rate; blood pressure; adrenaline level; perspiration rate; body temperature; vocal expression, e.g. voice level, voice pattern, voice stress, etc.; movement characteristics; facial expression; etc. Mood-associated behavioral characteristics can include sequence of content consumed, e.g. sequence of applications launched, rate at which the user changed applications, etc.; social networking activities, e.g. likes and/or comments on social media; user interface (UI) actions, e.g. rate of clicking, pressure applied to a touch screen, etc.; and/or emotional response to previously served targeted content. Mood-associated spatial-temporal characteristics can include location, date, day, time, and/or day part. The mood-associated characteristics can also include data regarding consumed content, such as music genre, application category, ESRB and/or MPAA rating, consumption time of day, consumption location, subject matter of the content, etc. In some cases, a user terminal 102 can be equipped with hardware and/or software that facilitates the collection of mood-associated characteristic data. For example, a user terminal 102 can include a sensor for detecting a user's heart rate or blood pressure. In another example, a user terminal 102 can include a camera and software that performs facial recognition to detect a user's facial expressions.

User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. As will become apparent from the remainder of this disclosure, the content delivery system 106 can learn of or derive user characteristics from any number of other information sources.

In some embodiments, the invitational content provided by the secondary content providers 110 can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect. For example, if separate dimensions are specified for city and state, these dimensions are non-orthogonal.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on mood-associated data expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting invitational content to target to users. The segment database 158 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 158 to add newly defined targeted segments or to delete targeted segments.

In some cases, a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City; mood, happy. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a segment-prioritizing module 128 for ordering the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

The system 100 can also be configured to include a mood analysis system 108 that can generate an inferred mood for one or more users. The mood analysis system 108 can receive current mood-associated data and based on a relationship between the current mood-associated data and at least one baseline mood profile, the mood analysis system 108 can generate an inferred mood. The current mood-associated data can specify one or more data items. Each mood-associated data item can be any mood-associated data specific to the user for which an inferred mood is to be generated, such as current and/or recent mood-associated characteristic data. In some cases, a mood-associated data item can indicate a user's emotional response to a previously served item of invitational content, e.g. happy, at ease, stressed, angry, etc. The user's emotional response can be evaluated in a variety of ways, such as by monitoring the user's vitals, through facial expression recognition, or based on how the user is interacting with the user interface.

Additionally, in some cases, a current mood-associated data item can be user independent data that is relevant to inferring and/or estimating a mood for the user, such as a current event. In some cases, user independent data can be used to adjust a baseline mood profile and/or an inferred mood. For example, if a tragic event occurred, an inferred mood can be downgraded. In another example, if the day corresponds to a national holiday, an inferred mood can be elevated. In yet another example, if the weather is particularly nice, an inferred mood can be elevated. Additional uses of user independent mood-associated data items are also possible.

Furthermore, each current mood-associated data item can have associated event data. Event data can include information corresponding to the occurrence of the specified data item, such as the consumption of a content item. For example, event data can specify a date; day; time; day part; location; how a digital media item was accessed or consumed, e.g. type of device, network, website; and/or any other circumstances surrounding the consumption of a media item.

Whether the mood analysis system 108 receives the current mood-associated data from the content delivery system 106, one of user terminals 102, and/or any other device capable of communicating with the mood analysis system 108 can vary with the configuration of the system 100 and/or the current mood-associated data. For example, in some cases, current mood-associated data can be specific to a user, such as mood-associated characteristic data. In this case, the current mood-associated data can be received from a user terminal 102 directly and/or indirectly through the content delivery system 106. Alternatively, current mood-associated data can be user independent. For example, the current mood-associated data can be a major current event of interest to all users or a significant date, such as a holiday. In this case, the current mood-associated data can be received from the content delivery system 106 and/or some other device capable of communicating with the mood analysis system 108, such as a news service.

In some embodiments, the mood analysis system 108 can include a mood profile database 160. The mood profile database 160 can be constructed based on mood-associated characteristic data related to one or more users. In some cases, the mood-associated characteristic data can be stored in the mood profile database 160. The mood profile database 160 can also store one or more baseline mood profiles for one or more users. A baseline mood profile can be generated from mood-associated characteristic data collected over a period of time to represent a user's standard mood.

In some cases, a baseline mood profile can be as simple as a single mood-associated characteristic identifier. The mood-associated characteristic identifier can have one or more mood-associated characteristic values assigned to it. A mood-associated characteristic value can be a discrete value, multiple discrete values, a range of values, multiple ranges of values, and/or any combination thereof. For example, the mood-associated characteristic identifier facial expression can be used in defining a baseline mood profile. The baseline mood profile can then include one or more facial expressions. In another example, the mood-associated characteristic identifier heart rate can be used in defining a baseline mood profile. The baseline mood profile can then include a heart rate range. However, more complex baseline mood profiles can also be defined. A baseline mood profile can be multi-dimensional and can include a dimension for each mood-associated characteristic identifier, e.g. heart rate, blood pressure, music genre, sequence of apps launched, rate of UI interactions, etc. In some cases, a dimension of a baseline mood profile can be based on a combination of multiple mood-associated characteristic identifiers. A baseline mood profile can also include multiple baselines for a single dimension. For example, a dimension can have a baseline for each of multiple day parts or for different moods, e.g. a baseline for happy, a baseline for angry, etc. Alternatively, instead of including multiple baselines in a single dimension, a user can have multiple baseline mood profiles. For example, a baseline mood profile for happy and another for angry.

In some embodiments, the mood profile database 160 can include one or more generic baseline mood profiles. A generic baseline mood profile can represent a standard mood for a hypothetical user. In some cases, a generic baseline mood profile can be defined specifically for the mood analysis system 108 and the baseline mood profile is not changed until a new generic baseline mood profile is defined. Alternatively, a generic baseline mood profile can be generated from mood-associated characteristic data from a collection of users. A generic baseline mood profile can be used in a number of different scenarios, such as when a user has elected to not allow the collection of mood-associated characteristic data, when a user is new and there is insufficient mood-associated characteristic data to generate a baseline mood profile for the user, or when the mood analysis system 108 is configured to only support generic baseline mood profiles.

The definition of standard mood can vary with the configuration of the system. In some cases, the definition of standard mood can be set for the mood analysis system 108. For example, standard mood can be defined as content—not overly happy, but not sad, angry, or dissatisfied either. Alternatively, a standard mood can be defined per user, per dimension, and/or per baseline mood profile. For example, a first user's standard mood can be content, while a second user's standard mood can be happy. In other example, a dimension based on music genre can have a standard of happy, while a dimension based on heart rate can have a standard of at ease.

A mood profile updater module 130 can be used to analyze the mood-associated characteristic data to generate and/or update one or more baseline mood profiles. For example, the mood profile updater module 130 can be configured to generate a dimension of a mood profile by averaging the mood-associated characteristic data relevant to that dimension. Other techniques for analyzing the mood-associated characteristic values to generate a baseline mood profile are also possible. In some embodiments, the mood profile updater module 130 can be configured to add additional mood profile data, update mood profile data, fill in missing mood profile data, or derive mood-associated characteristic values from known user characteristic values. For example, the mood profile updater module 130 can be configured to update a baseline mood profile upon receiving current mood-associated data.

The mood profile updater module 130 can also be configured to maintain the mood profile database 160 to include only more recently acquired mood-associated data, to re-derive any inferred mood-associated characteristic values, or to re-generate a baseline mood profile in order to ensure that the user mood profile is an accurate reflection of the current state of the user. For example, the mood profile updater module 130 can be configured to maintain the mood profile database 160 to include only data from the last two to three months. That is, the mood profile updater module 130 can be configured to maintain only two to three months of mood-associated characteristic data and/or to generate a baseline mood profile from mood-associated characteristic data from the last two to three months. However, the mood profile updater module 130 can be configured to adjust the data in the mood profile database 160 to cover any span of time. In some instances, the mood profile updater module 130 can update the mood profile database 160 in real-time. Alternatively, the mood profile updater module 130 can be configured to set an expiration period on a subset of the data in the mood profile database 160. For example, the data used to generate all or a portion of a mood profile can be set to expire after a specified period of time. In another example, all or a portion of a mood profile can be set to expire after a specified period of time. In some cases, a user can set the expiration period. In some instances, the mood profile updater module 130 can update the mood profile database 160 at least every week, or every day. That is, the mood profile updater module 130 can be configured to re-generate or update a baseline mood profile at periodic intervals. In some cases, the mood analysis system 108 can receive a direct request to update one or more baseline mood profiles. The update request can come directly from a user's device or any device capable of communicating with the mood analysis system 108, such as the content delivery system 106. In some cases, the mood analysis system 108 can receive an indirect request to update one or more baseline mood profiles. An indirect request can be the result of receiving new mood-associated characteristic data or a request for an inferred mood. An update request can occur at any time.

As described, a baseline mood profile can be generated from data collected over a period of time. Thus, the mood analysis system 108 might be able to generate a more accurate profile when more mood-associated characteristic data is available. Furthermore, individual users may have different baseline values for the same mood-associated characteristic identifier, e.g. heart rate, music genre, sequence of apps launched, rate of interaction with a UI, or have the same mood-associated characteristic value but different moods. For example, two users may both frequently listen to classical music. One user might listen when happy, while the other user might listen when feeling anxious for a calming effect. In another example, two users may both launch a sequence of apps. One user might launch the sequence of apps for work related activities and thus be in a stressed mood, while the other may have a personal interest in the content and thus be in a content mood. To increase the accuracy of a baseline mood profile, the mood analysis system 108 can be configured to initially and/or periodically poll the user. That is, the mood analysis system 108 can query the user's current mood. The results can then be used to calibrate the baseline mood profile. In some cases, a user can enable or disable the mood query feature.

The mood analysis system 108 can also include a mood estimator module 132 that can generate an inferred mood. In some cases, the mood analysis system 108 can receive a direct request to generate an inferred mood, such as from the content delivery system 106. The request can include current mood-associated data. Alternatively, in response to receiving the request, the mood analysis system 108 can request current mood-associated data from the content delivery system 106 and/or one of user terminals 102. In some cases, the mood analysis system 108 can receive an indirect request for an inferred mood. For example, the mood analysis system can be configured to generate an inferred mood in response to receiving current mood-associated data. A request to generate an inferred mood can occur at any time. Additionally, the mood analysis system 108 can be configured to generate one or more inferred moods at periodic intervals. Furthermore, in some cases, the result of a mood query can be used in place of an inferred mood.

As described above, the mood analysis system 108 can generate an inferred mood based on a relationship between current mood-associated data and one or more baseline mood profiles. The relationship can be determined using one or more mood rules or formulas, which can be stored in a mood rules database 162. The mood analysis system 108 can be configured to support mood rules of varying scope, such as general mood rules applicable to all users, mood rules specific to a user or baseline mood profile, mood rules specific to one or more mood-associated characteristic identifiers, mood rules specific to a dimension of a mood profile, etc.

To generate an inferred mood, the mood estimator module 132 can be configured with one or more mood rules and/or to obtain one or more mood rules from the mood rules database 162. The mood estimator module 132 can apply the one or more mood rules to the current mood-associated data and the one or more baseline mood profiles to generate an inferred mood. The number and/or type of inferred moods generated can vary with the configuration of the system. Exemplary inferred moods can include happy, sad, angry, content, at ease, anxious, stressed, etc.

Additionally, the mood analysis system 108 can include a communications interface 134. The communications interface 134 can be configured to send and receive data, such as current mood-associated data, user characteristic data, and/or an inferred mood. Furthermore, the communications interface 134 can pass the received data to the mood profile updater module 130 and/or the mood estimator module 132.

Although the mood profile system 108 is presented herein as a separate entity, this is for illustrative purposes only. In some cases, the content delivery system 106 can include the mood profile system 108. Alternatively, user terminals 102 can each include all or part of a mood profile system 108.

A person skilled in the relevant art will recognize that while the disclosure uses the inferred mood in targeted content delivery, the inferred mood can be used in other contexts as well. For example, the inferred mood can be used to enable and/or disable features on a user terminal, e.g. disable some or all incoming calls on a smartphone. In another example, the inferred mood can be used to set or adjust the volume on a playback device, e.g. increase the volume when a user's inferred mood is happy or decrease the volume when a user's inferred mood is agitated.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide mood-associated data for targeted content delivery services. In yet another example, users can select to limit the length of time mood-associated data is maintained or entirely prohibit the development of a baseline mood profile.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Figure 2:
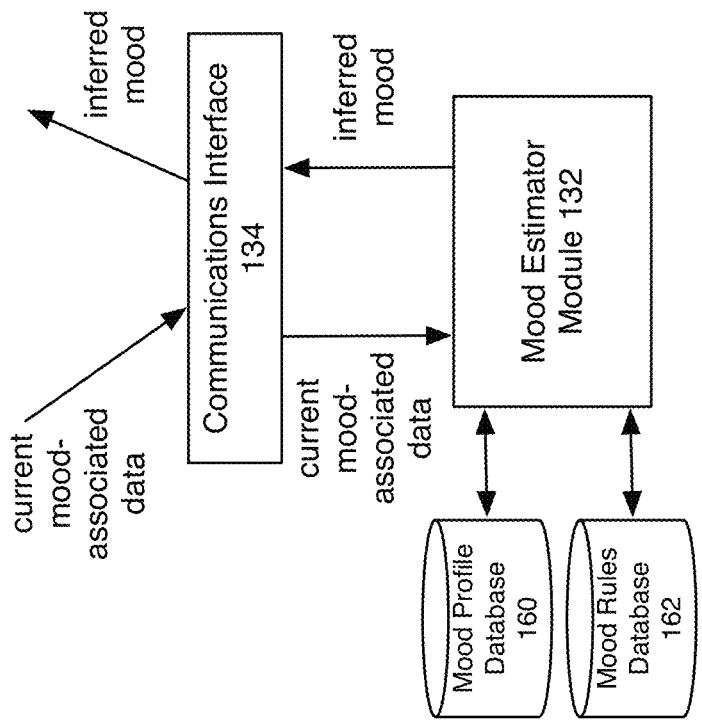
FIG. 2 illustrates an exemplary mood inference process.

FIG. 2 illustrates an exemplary mood inference process 200 based on the mood analysis system 108. As described above, the communications interface 134 can be configured to receive current mood-associated data. The current mood-associated data can specify one or more mood-associated data items. Furthermore, a mood-associated data item can have associated event data. The communications interface 134 can pass the current mood-associated data along to the mood estimator module 132.

The mood estimator module 132 can be configured to receive the current mood-associated data from the communications interface 134. After receiving the current mood-associated data, the mood estimator module 132 can obtain at least one baseline mood profile from the mood profile database 160. In some embodiments, an obtained baseline mood profile can be specific to a user. Alternatively, an obtained baseline mood profile can be a generic baseline mood profile.

Additionally, the mood estimator module 132 can obtain one or more mood rules. A mood rule can be used to define how one or more current mood-associated data items should be combined and/or compared with one or more baseline mood profiles to generate an inferred mood. For example, a mood rule can specify that if specific mood-associated characteristic values occur in the current mood-associated data then the values should be combined, e.g. blood pressure and heart rate. In another example, a mood rule can specify that one mood-associated characteristic value should be used as opposed to another, e.g. music genre as opposed to sequence of apps launched. In a further example, a mood rule can specify one or more weights to apply to one or more mood-associated characteristic values, e.g. weight one or more values more than other values. In yet another example, a mood rule can specify to use a majority vote process, e.g. if the majority of the values indicate a particular mood then that is the inferred mood. In still another example, a mood rule can specify which baseline mood profile to use, or how to weight and/or combine multiple baseline mood profiles. In still a further example, a mood rule can specify that if specific mood-associated characteristic values occur together in the current mood-associated data then additional weight should be applied to the values, e.g. the contribution of the values should be magnified. A particular example of the magnification effect mood rule can be if a user was viewing content on a social media site, and the content was determined to be happy content, plus a close relative of the user posted the content, then the value should be more heavily weighted. Additional mood rules are also possible, such as assigning a higher weight to more recent values, more frequently consumed content items, particular mood-associated characteristic identifiers, particular content item categories, or a particular baseline mood profile. For example, if a content item is associated with a particular mood, then it can be assigned a higher weight when more frequently used and/or consumed.

After receiving the current mood-associated data and obtaining at least one baseline mood profile, the mood estimator module 132 can apply the one or more rules to the current mood-associated data and the one or more baseline mood profiles to generate an inferred mood. In some cases, the application of multiple rules can result in multiple inferred moods. In this case, a predefined criterion can be used to select an inferred mood. For example, the moods can be averaged, the mood that occurred most frequently can be selected, the mood with the highest confidence score can be selected, etc.

The mood estimator module 132 can pass the inferred mood to the communications interface 134. The communications interface 134 can send the inferred mood to the requesting device, such as the content delivery system 106. The requesting device can then use the inferred mood to enable a variety of different types of functionality. For example, the content delivery system 106 can use the inferred mood to assign a user to a mood segment and/or prioritize targeted content packages assigned to a user. In some cases, an item of invitational content can be associated with one or more moods and then the content delivery system 106 can selected an item for a user based on a match between the mood tag and the user's inferred mood. Additionally, an inferred mood can be used to alter the configuration of a targeted content package. For example, if the user's inferred mood is agitated, the content package can include fewer steps. In another example, an aspect of an item of invitational content can be changed based on the user's inferred mood. Furthermore, in some cases, the content delivery system 106 can charge a different rate for content delivered based on an inferred mood. For example, the content delivery system 106 can charger a higher rate for mood based content delivery. In another example, the content delivery system 106 can charged different rates for mood based content delivery depending on a confidence score associated with the inferred mood, e.g. a higher confidence score can be associated with a higher price. Additionally, the content delivery system 106 can receive an indication of a user's emotional response to a previously served item of invitational content, either directly from a user terminal 102 or from the mood analysis system 108. The content delivery system 106 can use this information in selecting future items of invitational content. For example, if the user had a positive reaction, the content delivery system 106 can select similar content.

Figure 3:
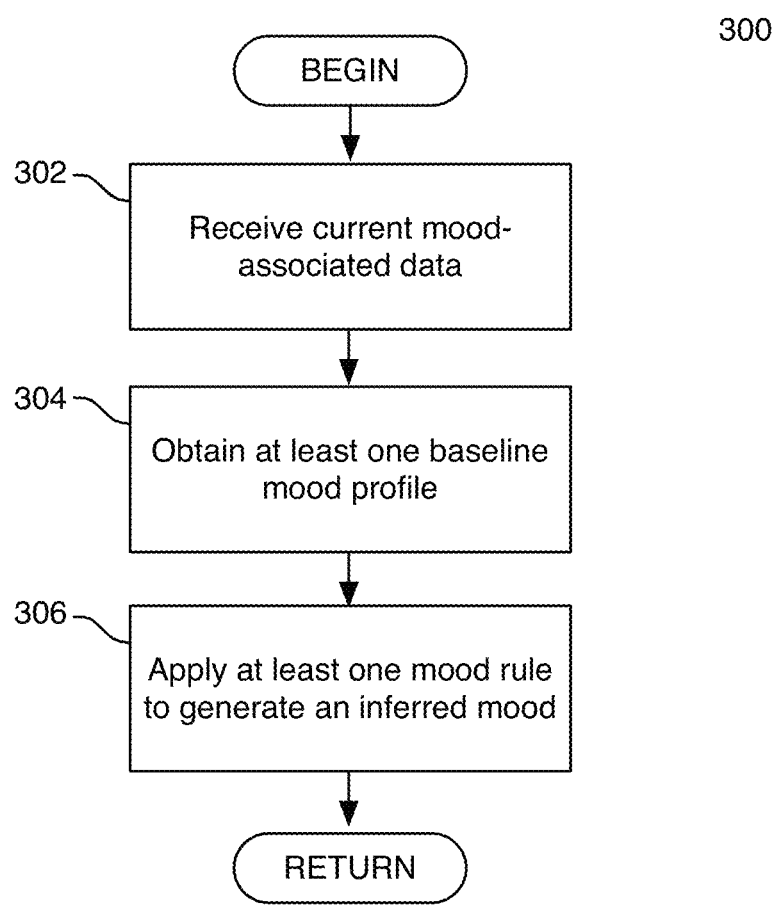
FIG. 3 illustrates an exemplary method for generating an inferred mood for a user.

FIG. 3 is a flowchart illustrating steps in an exemplary method 300 for generating an inferred mood for a user. For the sake of clarity, this method is discussed in terms of an exemplary system such as is shown in FIG. 1. Although specific steps are shown in FIG. 3, in other embodiments a method can have more or less steps than shown.

The mood analysis system 108 can receive current mood-associated data associated with a user (302). The current mood-associated data can specify one or more current mood-associated data items, such as recently consumed content items. A recently consumed content item can include a digital media item, a social networking activity, and/or an invitational content item response. Examples of digital media items can include apps, digital audio, digital videos, digital publications, webpages, invitational content, etc. A mood-associated data item can also have associated event data corresponding to the occurrence of the mood-associated data item. For example, a mood-associated data item that corresponds to a recently consumed content item can have event data indicating how the consumption of the content item occurred, e.g. date, day, time, day part, or location of the consumption; the type of device used to consumed the content item; the network type; the website the content obtained from; etc. Furthermore, the current mood-associated data can include one or more mood-associated data items that are user independent.

At some point, the mood analysis system 108 can obtain at least one baseline mood profile (304). The at least one baseline mood profile can be specific to the user for which the inferred mood is being generated. As described above, the user specific baseline profile can be generated from mood-associated data, such as mood-associated characteristic data collected over a period of time. Alternatively, the at least one baseline mood profile can be a general baseline mood profile to model a hypothetical user. In the case of multiple baseline mood profiles, the baseline mood profiles can be user specific and/or general baseline mood profiles. In some cases, a baseline mood profile can have an associated weight or confidence score. The associated weight or confidence score can be based on the amount of information used to create the baseline profile. For example, a baseline mood profile created from very little mood-associated data can have a lower confidence score. In another example, a general baseline mood profile can be assigned a lower weight under a theory that it is less likely to be a close match to the user's actual baseline mood profile. In some cases, when multiple baseline mood profiles are obtained an associated weight or confidence score can be used to select one or a subset of baseline mood profiles to use in inferring the mood.

After receiving the current mood-associated data and obtaining at least one baseline mood profile, the mood analysis system 108 can apply at least one mood rule to generate an inferred mood (306). As previously described, a mood rule can specify how one or more mood-associated data items are combined and/or how mood-associated data items can be compared to the baseline mood profile to derive an inferred mood. Additionally, as part of the inferred mood generation method, the mood analysis system 108 can assign a confidence score to the inferred mood, where the confidence score represents the likelihood that the inferred mood is valid and/or correct. For example, an inferred mood can be assigned a value in the range [0,1], where 0 indicates no confidence and 1 indicates full confidence. Other relative indicators of confidence can also be used, such as a percentage. In some cases, the confidence score associated with an inferred mood for a user can evolve over time. For example, the confidence score can start at 0, and as the one or more baseline mood profiles are refined over time, the confidence score can increase. The calculation of the confidence score can depend on the baseline mood profile used, the one or more rules applied in order to generate the inferred mood, the number of mood-associated characteristics considered, the number of mood-associated characteristics that matched the baseline profile, etc. Additionally, in some cases, the inferred mood confidence score can be based at least in part on a weight or confidence score assigned to the baseline mood profile. For example, if the baseline mood profile has a lower associated confidence score, the confidence score for the inferred mood can be decreased.

In some embodiments, the mood analysis system 108 can send the inferred mood to the content delivery system 106 where it can be used to select invitational content to send to a user terminal 102. For example, the content delivery system 106 can use the inferred mood to assign a user to a mood segment, prioritize targeted content packages assigned to a user, and/or select an item of invitation content based on a match between a mood tag and the user's inferred mood. After deriving an inferred mood, or alternatively sending the inferred mood to a requesting device, the mood analysis system 108 can resume previous processing, which can include repeating method 300.

Figure 4:
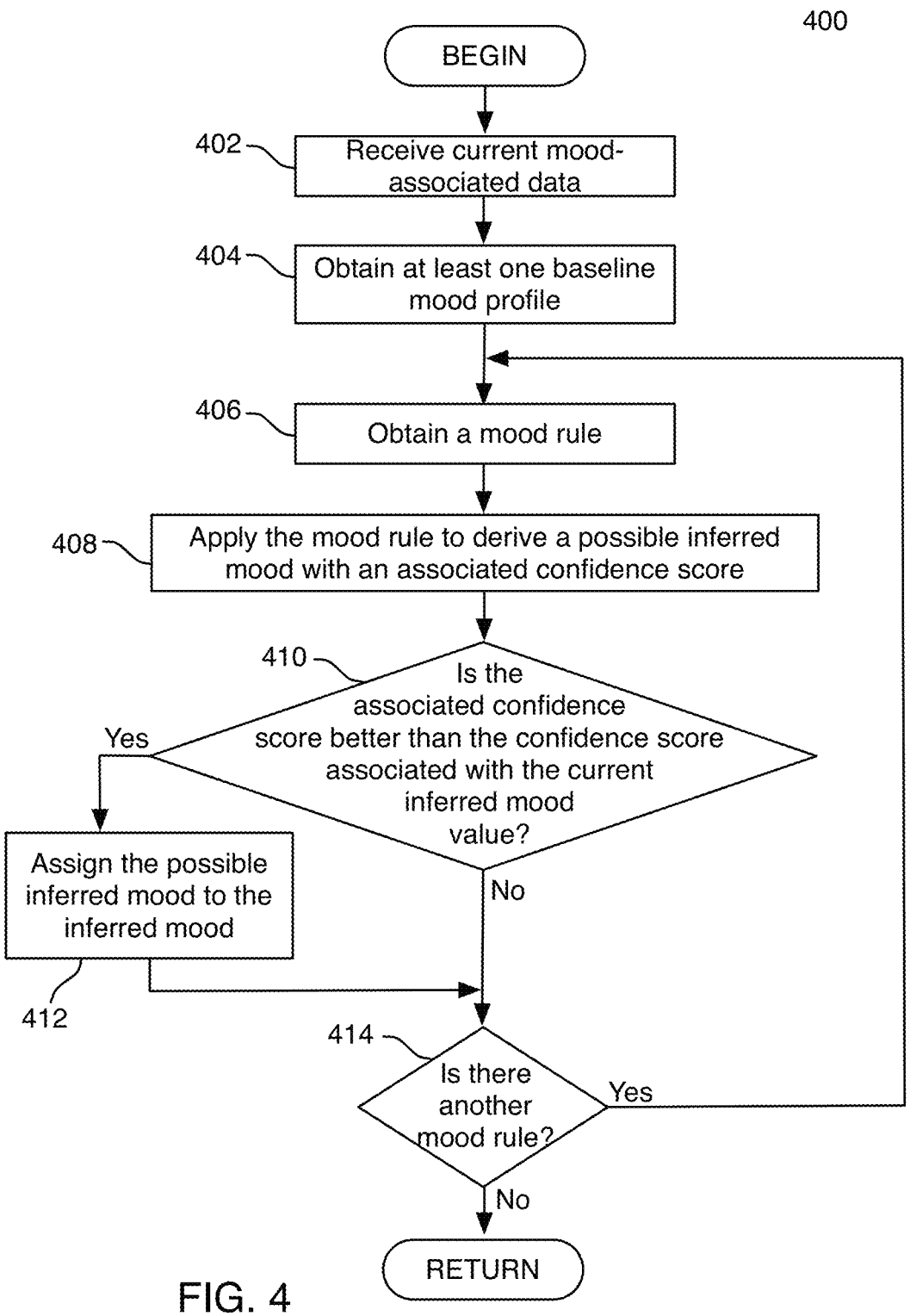
FIG. 4 illustrates an exemplary method for generating an inferred mood for a user based on multiple mood rules.

FIG. 4 is a flowchart illustrating steps in an exemplary method 400 for generating an inferred mood for a user based on multiple mood rules. For the sake of clarity, this method is discussed in terms of an exemplary system such as is shown in FIG. 1. Although specific steps are shown in FIG. 4, in other embodiments a method can have more or less steps than shown.

The mood analysis system 108 can receive current mood-associated data associated with a user (402). The current mood-associated data can specify one or more current mood-associated data items, such as recently consumed content items. A mood-associated data item can also have associated event data corresponding to the occurrence of the mood-associated data item. Furthermore, the current mood-associated data can include one or more mood-associated data items that are user independent.

At some point, the mood analysis system 108 can obtain at least one baseline mood profile (404). The at least one baseline profile can be specific to the user for which the inferred mood is being generated. Alternatively, the at least one baseline mood profile can be a general baseline mood profile to model a hypothetical user. In the case of multiple baseline mood profiles, the baseline mood profiles can be user specific and/or general baseline mood profiles. In some cases, a baseline mood profile can have an associated weight or confidence score.

Additionally, the mood analysis system 108 can obtain a mood rule (406). As described above, a mood rule can be used to define how one or more current mood-associated data items should be combined and/or compared with the at least one baseline mood profile to derive an inferred mood. The mood analysis system can include a variety of different mood rules. After obtaining a mood rule, the mood analysis system 108 can apply the mood rule to the current mood-associated data and the at least one baseline mood profile to generate a possible inferred mood (408). In some cases, multiple mood rules can produce different, and even conflicting results. For example, applying a first mood rule can result in an inferred mood of happy, while applying a second mood rule can result in an inferred mood of content. Therefore, the mood analysis system 108 can be configured to associate a confidence score with a generated inferred mood. An associated confidence score can be used to determine how or if a particular inferred mood should be used.

In method 400, the associated confidence score can be used to select an inferred mood with the highest associated confidence score. Therefore, the mood analysis system 108 can compare the confidence score associated with the possible inferred mood with the confidence score associated with the current inferred mood candidate (410). If the new confidence score is better than the old confidence score, the newly generated possible inferred mood can be set as the candidate inferred mood (412). After setting the candidate inferred mood, or if the new confidence score was not better, the mood analysis system 108 can check if there is another mood rule to apply (414). If so, the mood analysis system 108 can repeat the mood rule application process by obtaining a new mood rule (406). In some cases, the mood analysis system 108 can apply only a subset of the mood rules available to the system. For example, the mood analysis system 108 can be configured with different sets of mood rules, such as mood rules that only apply to generic baseline mood profiles or mood rules that only apply to baseline mood profiles for specific moods. If no additional mood rules are eligible to be applied to the data, the candidate inferred mood can become the inferred mood. In some cases, the mood analysis system 108 can send the generated inferred mood to another system and/or device. After applying all possible mood rules, the mood analysis system 108 can resume previous processing, which can include repeating method 400.

Figure 5:
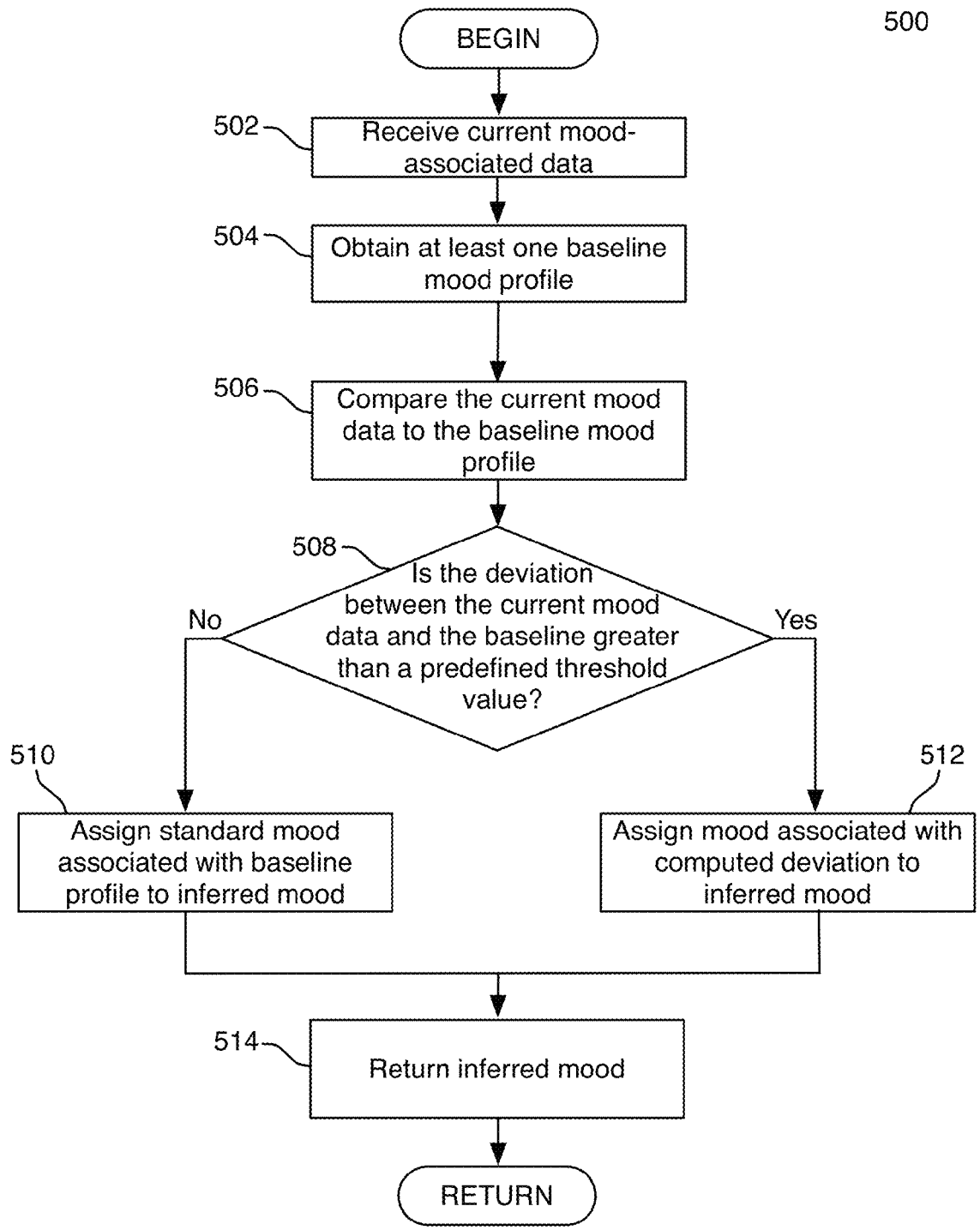
FIG. 5 illustrates an exemplary method for generating an inferred mood for a user based on a deviation from a baseline mood profile.

FIG. 5 is a flowchart illustrating steps in an exemplary method 500 for generating an inferred mood for a user based on a deviation from a baseline mood profile. For the sake of clarity, this method is discussed in terms of an exemplary system such as is shown in FIG. 1. Although specific steps are shown in FIG. 5, in other embodiments a method can have more or less steps than shown.

The mood analysis system 108 can receive current mood-associated data associated with a user (502). The current mood-associated data can specify one or more current mood-associated data items, such as recently consumed content items. A mood-associated data item can also have associated event data corresponding to the occurrence of the mood-associated data item. Furthermore, the current mood-associated data can include one or more mood-associated data items that are user independent.

At some point, the mood analysis system 108 can obtain at least one baseline mood profile (504). The at least one baseline profile can be specific to the user for which the inferred mood is being generated. Alternatively, the baseline mood profile can be a general baseline mood profile to model a hypothetical user. In the case of multiple baseline mood profiles, the baseline mood profiles can be user specific and/or general baseline mood profiles. In some cases, a baseline mood profile can have an associated weight or confidence score.

After receiving the current mood-associated data and obtaining at least one baseline mood profile, the mood analysis system 108 can compare the current mood-associated data to the at least one baseline mood profile (506). In some cases, the mood analysis system 108 can use all of the mood-associated data items in the current mood-associated data in the comparison process. However, the mood analysis system 108 can also be configured to only consider a subset of the current mood-associated data items. For example, the mood analysis system 108 can disregard mood-associated data items in which a date in an associated event data exceeds a specified threshold date. In another example, the mood analysis system 108 can disregard mood-associated data items in which a location in an associated event data is on a location blacklist or not on a location whitelist. In yet another example, the mood analysis system 108 can disregard mood-associated data items in favor of other mood-associated data items that are deemed to be more reliable in deriving a user's mood. In a further example, the mood analysis system 108 can disregard mood-associated data items that have an associated weight or confidence score below a predefined threshold value. In some cases, the mood data items used can depend on the at least one baseline mood profile. For example, the mood analysis system 108 can disregard mood-associated data items that do not correspond to a dimension in the baseline mood profile. In some cases, the comparison process can be guided by one or more mood rules, such as the mood rules previously described. The mood rules can describe what values should be compared, which baseline profile(s) should be used, what values should be combined, what and/or when a weight should be applied, how to compute a confidence score, etc.

The comparison process can be configured to yield a variety of different result formats. For example, a result can be binary, such as I/O, match/no match, true/false, etc. A result can also be a deviation value. That is, a value representing the degree of difference between the current mood-associated data and the baseline mood profile. For example, the comparison result can indicate that the number "likes" on social media content over specified time interval has increased by a calculated percentage or absolute value. In another example, the comparison result can indicate that the speed at which the user changed apps increased. In a further example, a comparison result can indicate that the genre of music the user is listening to is different. In yet another example, a comparison result can indicate that the sequence of apps launched or content consumed is different. Additional comparison result formats are also possible. Furthermore, in some cases, the comparison result can have an associated confidence score. The mood analysis system 108 can use the associated comparison confidence score in generating a confidence score for the inferred mood.

In method 500, the result of the comparison process can be a deviation value. Therefore, the mood analysis system 108 can check if the deviation value is greater than a predefined threshold value (508). The predefined threshold value can be a single value specific to the mood analysis system 108. However, the mood analysis system 108 can also be configured to support multiple predefined threshold values. For example, the mood analysis system 108 can include different threshold values for different baseline profiles. In another example, the mood analysis system 108 can vary the threshold value depending on the confidence score associated with the comparison result, e.g. the greater the confidence score the more rigid the threshold value. In a further example, the mood analysis system 108 can vary the threshold value depending on the confidence score(s) associated with the at least one baseline mood profile, e.g. the greater the confidence score(s) the smaller the deviation region. Additional techniques for setting the threshold value are also possible.

If the computed deviation value is within the predefined threshold, the mood analysis system 108 can assign the standard mood associated with the baseline profile(s) used to infer and/or derive the mood (510). For example, if the standard mood associated with the baseline mood profile is "at ease," the mood analysis system 108 can set the inferred mood to "at ease." However, if the computed deviation is outside of the predefined threshold, the mood analysis system 108 can assign a mood associated with the computed deviation to the inferred mood (512). That is, a baseline mood profile can have one or more different associated deviation regions that correspond to different moods, and the inferred mood can be assigned depending on where the computed deviation falls in the deviation regions. For example, a standard mood associated with the baseline can be "at ease." The baseline can then have multiple deviation regions above the standard, e.g. happy, over joyed, and ecstatic, and multiple deviation regions below the standard, e.g. unhappy, stressed, and angry. The inferred mood can be assigned depending on where the computed deviation falls, above or below the standard. For example, a deviation value that indicates an increase in the number of "likes" of social media content can correspond to happy mood, while a decrease can correspond to an un-happy mood. In another example, a deviation value that indicates an increase in the speed at which the user changes apps can correspond to a stressed mood, while a decrease can correspond to a relaxed mood. Additional methods of selecting a mood when the deviation has exceeded a predefined threshold are also possible.

Once the inferred mood has been generated, it can be returned to the requester (514), such as the content delivery system 106 and/or some other device capable of communicating with the mood analysis system 108. After returning the inferred mood, the mood analysis system 108 can resume previous processing, which can include repeating method 500.

In some embodiments, all or part of inferring a mood can be performed on a user terminal 102. That is, all or part of the mood analysis system 108 can reside on a user terminal 102. The user terminal 102 can be configured to collect and analyze user characteristic data to generate one or more baseline mood profiles. Prior to, or at the time of making a request for an item of invitational content, a user terminal 102 can compute an inferred mood using one of the previously described mood inference methods. The user terminal 102 can send the inferred mood along with the request for an item of invitational content or in response to receiving a request for an inferred mood. In some cases, such a configuration can be advantageous in that user characteristic data and the user's baseline mood profile(s) can reside on a device under the user's control. Furthermore, once the user terminal 102 has analyzed the user characteristic data, the user terminal 102 can purge the user characteristic data. For example, once the user terminal 102 has generated or updated a baseline mood profile, the user terminal 102 can delete the collected user characteristic data. In some configurations, a user terminal 102 can perform a subset of the mood inference or estimating process. For example, a user terminal 102 can be configured to collect and analyze the user characteristic data to generate one or more baseline mood profiles. The user terminal 102 can then send at least one baseline mood profile to the content delivery system 106 and/or the mood analysis system 108 when requesting a digital media item based on mood. The content delivery system 106 and/or mood analysis system 108 can then use the at least one baseline mood profile to generate an inferred mood. Additional configurations in which a user terminal 102 performs at least a subset of the mood inference or estimating process are also possible.

Figure 6:
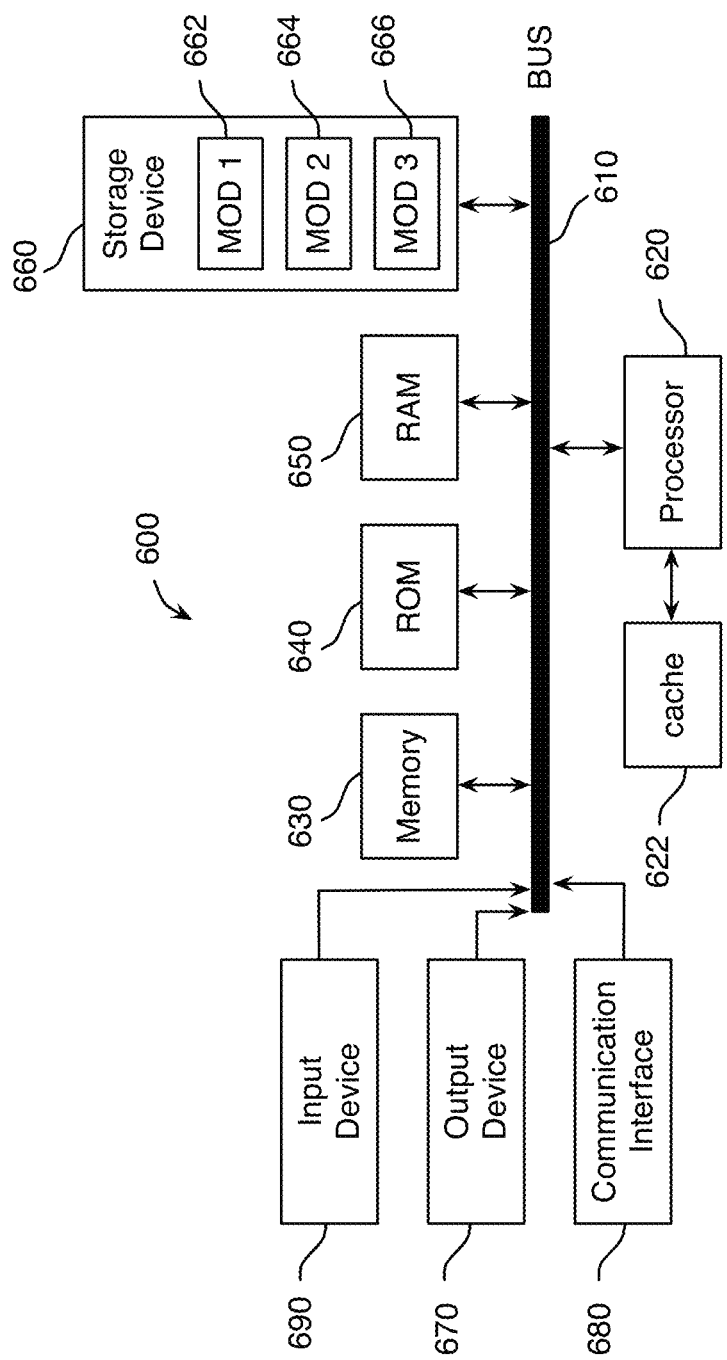
FIG. 6 illustrates an exemplary system embodiment.

With reference to FIG. 6, an exemplary system 600 includes a general-purpose computing device 600, including a processing unit (CPU or processor) 620 and a system bus 610 that couples various system components including the system memory 630 such as read only memory (ROM) 640 and random access memory (RAM) 650 to the processor 620. The system 600 can include a cache 622 connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer readable storage media provide nonvolatile storage of computer readable instructions, data structures, program modules and other data for the computing device 600. In one aspect, a hardware module that performs a particular function includes the software component stored in a non-transitory computer-readable medium in connection with the necessary hardware components, such as the processor 620, bus 610, output device 670, and so forth, to carry out the function. The basic components are known to those of skill in the art and appropriate variations are contemplated depending on the type of device, such as whether the device 600 is a small, handheld computing device, a desktop computer, or a computer server.

Although the exemplary embodiment described herein employs the hard disk 660, it should be appreciated by those skilled in the art that other types of computer readable media which can store data that are accessible by a computer, such as magnetic cassettes, flash memory cards, digital versatile disks, cartridges, random access memories (RAMs) 650, read only memory (ROM) 640, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 620. The functions these blocks represent may be provided through the use of either shared or dedicated hardware, including, but not limited to, hardware capable of executing software and hardware, such as a processor 620, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 640 for storing software performing the operations discussed below, and random access memory (RAM) 650 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited non-transitory computer-readable storage media. Such logical operations can be implemented as modules configured to control the processor 620 to perform particular functions according to the programming of the module. For example, FIG. 6 illustrates three modules Mod1 662, Mod2 664 and Mod3 666 which are modules configured to control the processor 620. These modules may be stored on the storage device 660 and loaded into RAM 650 or memory 630 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method comprising:
    receiving current mood-associated data associated with a user, the current mood-associated data specifying one or more current mood-associated data items, wherein at least one current mood-associated data item corresponds to a recently consumed content item;
    obtaining at least one baseline mood profile;
    applying, via a processor, a plurality of mood rules to the current mood-associated data and the at least one baseline mood profile to generate a plurality of inferred moods for the user, the plurality of inferred moods being associated with confidence scores; and
    selecting at least one of the plurality of inferred moods based on the confidence scores.

2. The method of claim 1, wherein the at least one current mood-associated data item has associated event data, the event data corresponding to how the consumption of the content item occurred.

3. The method of claim 2, wherein event data comprises at least one of date, day, time, day part, location, device type, network, or website.

4. The method of claim 1, wherein the at least one baseline mood profile is assigned a confidence score.

5. The method of claim 1, wherein the at least one baseline mood profile is specific to the user.

6. The method of claim 1, further comprising:
    assigning the user to at least one mood segment based on the inferred mood.

7. A non-transitory computer-readable storage media storing instructions which, when executed by a computing device, causes the computing device to perform operations comprising:
    receiving current mood-associated data associated with a user, the current mood-associated data specifying one or more current mood-associated characteristic values, wherein at least one current mood-associated characteristic value corresponds to a recently consumed content item;
    obtaining at least one baseline mood profile;
    applying a plurality of mood rules to the current mood-associated data and the at least one baseline mood profile to generate a plurality of inferred moods for the user, the plurality of inferred moods being associated with confidence scores; and
    selecting at least one of the plurality of inferred moods based on the confidence scores.

8. The non-transitory computer-readable storage media of claim 7, storing additional instructions which, when executed by the computing device, result in an operation further comprising:
    serving to the user, a targeted content package, the targeted content package selected from a prioritized plurality of targeted content packages, wherein the prioritized plurality of targeted content packages are prioritized based on at least one of the plurality of inferred moods.

9. The non-transitory computer-readable storage media of claim 7, storing additional instructions which, when executed by the computing device, result in an operation further comprising:
    updating the at least one obtained baseline mood profile based on the current mood-associated data.

10. The non-transitory computer-readable storage media of claim 7, wherein the at least one current mood-associated characteristic value has associated event data, the event data corresponding to how a consumption of the content item occurred.

11. The non-transitory computer-readable storage media of claim 7, wherein the recently consumed content item comprises at least one of a digital media item, a social networking activity, or an invitational content item response.

12. The non-transitory computer-readable storage media of claim 11, wherein a current mood-associated characteristic value further corresponds to at least one of facial expression characteristics, vocal expression characteristics, or biometric values.

13. A system comprising:
    a processor; and
    a computer-readable medium having stored therein instructions which, when executed by the processor, cause the processor to perform operations comprising:
        receiving current mood-associated data associated with a user, the current mood-associated data specifying one or more current mood-associated data items, wherein at least one current mood-associated data item species at least one recently consumed content item;
        obtaining at least one baseline mood profile;
        applying a plurality of mood rules to the current mood-associated data and the at least one baseline mood profile to generate a plurality of inferred moods for the user, the plurality of inferred moods being associated with confidence scores; and
        selecting at least one of the plurality of inferred moods based on the confidence scores.

14. The system of claim 13, the computer-readable medium storing additional instructions which, when executed by the processor, result in an operation further comprising:
    re-generating at least one baseline mood profile based on the current mood-associated data.

15. The system of claim 13, wherein obtaining the at least one baseline mood profile further comprises:
    obtaining mood-associated characteristic data associated with the user; and
    analyzing the mood-associated characteristic data to generate the at least one baseline mood profile.

16. The system of claim 13, the computer-readable medium storing additional instructions which, when executed by the processor, result in an operation further comprising:
    serving a targeted content package based on assigned mood segments.

17. The system of claim 13, wherein the at least one recently consumed content item has an assigned weight.

18. The system of claim 17, wherein the assigned weight is higher when a content item is consumed more recently.

19. The system of claim 17, wherein the assigned weight is higher when a content item is more frequently consumed.

20. The system of claim 13, the computer-readable medium storing additional instructions which, when executed by the processor, result in an operation further comprising comparing the current mood-associated data to the at least one baseline mood profile by applying at least one mood rule.

21. A method comprising:
    receiving current mood-associated data associated with a user, the current mood-associated data specifying one or more current mood-associated data items, wherein at least one current mood-associated data item corresponds to a recently consumed content item;
    deriving, via a processor, an inferred mood for the user by applying a plurality of mood rules to the current mood-associated data and at least one obtained baseline mood profile to generate a plurality of inferred moods for the user, the plurality of inferred moods being associated with confidence scores;
    selecting at least one of the plurality of inferred moods based on the confidence scores to yield a selected inferred mood;
    identifying a plurality of targeted content packages for the user;
    prioritizing the plurality of targeted content packages, wherein the prioritizing is based at least in part on the selected inferred mood.

22. The method of claim 21, wherein at least one baseline mood profile is a general baseline mood profile having an associated confidence score.

23. The method of claim 22, further comprising:
    serving to the user, a targeted content package, the targeted content package selected from the prioritized plurality of content packages.

24. A computer implemented method comprising:
    receiving current mood-associated data associated with an identified user, the current mood-associated data comprising at least one current mood-associated characteristic data item, wherein the current mood-associated data item specifies at least one recently consumed content item;
    obtaining at least one baseline mood profile for the identified user;
    inferring, via a processor, a current mood by applying a mood rule, wherein applying the mood rule comprises:
        applying a plurality of mood rules to the current mood-associated data and the at least one baseline mood profile to generate a plurality of inferred moods for the user, the plurality of inferred moods being associated with confidence scores, and
        selecting at least one of the plurality of inferred moods based on the confidence scores to yield an inferred current mood, and
    sending the inferred current mood.

25. The method of claim 24, further comprising:
    updating at least one baseline mood profile based on the current mood-associated data; and
    purging the current mood-associated data.

26. The method of claim 25, wherein the inferred current mood is sent in response to a request for invitational content.

27. The method of claim 26, wherein the at least one baseline mood profile is assigned a confidence score.

* * * * *